(12) United States Patent
Berler et al.

(10) Patent No.: US 10,733,290 B2
(45) Date of Patent: Aug. 4, 2020

(54) DEVICE-BASED ANTI-MALWARE (71) Applicant: Western Digital Technologies, Inc., San Jose, CA (US)

(72) Inventors: Danny Berler, Tel-Mond (IL); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 257 days.

(21) Appl. No.: 15/794,709

(22) Filed: Oct. 26, 2017

(65) Prior Publication Data

US 2019/0130097 A1    May 2, 2019

(51) Int. Cl.
*G06F 21/55* (2013.01)
*G06F 21/56* (2013.01)
*G06F 21/78* (2013.01)

(52) U.S. Cl.
CPC .......... *G06F 21/554* (2013.01); *G06F 21/552* (2013.01); *G06F 21/562* (2013.01); *G06F 21/566* (2013.01); *G06F 21/567* (2013.01); *G06F 21/78* (2013.01); *G06F 2221/034* (2013.01)

(58) Field of Classification Search
CPC .... G06F 21/554; G06F 21/552; G06F 21/562; G06F 21/566; G06F 21/567; G06F 21/78; G06F 2221/034
See application file for complete search history.

(56) References Cited

U.S. PATENT DOCUMENTS

| 4,897,840 | A | * | 1/1990 | Weiss | G06F 3/0601 |
| | | | | | 714/765 |
| 7,340,777 | B1 | * | 3/2008 | Szor | G06F 21/562 |
| | | | | | 713/165 |

(Continued)

OTHER PUBLICATIONS

Moon et al., Detecting and Preventing Kernel Rootkit Attacks with Bus Snooping, Mar. 2017, IEEE Transactions on Dependable and Secure Computing, vol. 2, No. 2, p. 145-157 (Year: 2017).*

(Continued)

*Primary Examiner* — J. Brant Murphy
*Assistant Examiner* — Stephen T Gundry
(74) *Attorney, Agent, or Firm* — Patterson & Sheridan, LLP; Steven H. Versteeg (57) ABSTRACT

Methods and equipment for determining whether a ransomware attack is suspected include a data storage device including a controller; non-volatile memory; a data path between the controller and the non-volatile memory; and an anti-ransomware module configured to monitor the data path. Methods and equipment also include monitoring a data path between a controller and a non-volatile memory on a data storage device; calculating an entropy of a data set to be written to the non-volatile memory; analyzing the calculated entropy; and determining whether a malware attack is suspected. Methods and equipment also include monitoring a data path between a controller and a non-volatile memory on a data storage device; identifying activity indicative of ransomware; once activity indicative of ransomware has been identified, calculating an entropy of a data set to be written to the non-volatile memory; analyzing the calculation; and determining whether a ransomware attack is suspected.

27 Claims, 5 Drawing Sheets

(56) References Cited

U.S. PATENT DOCUMENTS

| | | | |
|---|---|---|---|
| 8,141,154 B2 | 3/2012 | Gruzman et al. | |
| 8,713,674 B1 * | 4/2014 | Geide | G06F 21/552 726/22 |
| 8,856,542 B2 | 10/2014 | Tatarinov et al. | |
| 9,317,686 B1 | 4/2016 | Ye et al. | |
| 9,383,934 B1 * | 7/2016 | Lukacs | G06F 3/0622 |
| 9,483,644 B1 * | 11/2016 | Paithane | G06F 16/128 |
| 9,514,309 B1 * | 12/2016 | Mann | G06F 21/60 |
| 9,552,384 B2 | 1/2017 | Narasimha et al. | |
| 9,881,157 B1 * | 1/2018 | Lukacs | G06F 3/0622 |
| 9,980,146 B2 * | 5/2018 | Raleigh | H04W 12/12 |
| 10,055,582 B1 * | 8/2018 | Weaver | G06F 21/552 |
| 2006/0026417 A1 * | 2/2006 | Furusawa | G06F 21/575 713/2 |
| 2009/0307452 A1 * | 12/2009 | Hahn | G06F 21/78 711/164 |
| 2011/0099635 A1 * | 4/2011 | Silberman | G06F 21/56 726/24 |
| 2014/0223566 A1 * | 8/2014 | Zaitsev | G06F 21/567 726/24 |
| 2014/0237600 A1 * | 8/2014 | Silberman | G06F 21/56 726/24 |
| 2016/0162886 A1 | 6/2016 | Howe | |
| 2016/0283714 A1 * | 9/2016 | LeMay | G06F 21/52 |
| 2016/0323316 A1 | 11/2016 | Kolton et al. | |
| 2016/0378988 A1 | 12/2016 | Bhashkar et al. | |
| 2017/0091451 A1 * | 3/2017 | Kovac | G06F 21/562 |
| 2017/0091461 A1 * | 3/2017 | Tin | G06F 21/564 |
| 2017/0093886 A1 * | 3/2017 | Ovcharik | G06F 21/563 |
| 2017/0140156 A1 | 5/2017 | Gu et al. | |
| 2017/0206353 A1 | 7/2017 | Jai et al. | |
| 2017/0318035 A1 * | 11/2017 | Baughman | G06N 3/08 |
| 2017/0339178 A1 * | 11/2017 | Mahaffey | H04L 67/16 |
| 2017/0364681 A1 * | 12/2017 | Roguine | G06F 21/554 |
| 2018/0103049 A1 * | 4/2018 | Garry | H04L 63/1425 |
| 2018/0227317 A1 * | 8/2018 | Xu | H04L 63/1466 |
| 2018/0288074 A1 * | 10/2018 | Thayer | H04L 63/145 |
| 2018/0293176 A1 * | 10/2018 | Borlick | H04L 63/145 |
| 2018/0293379 A1 * | 10/2018 | Dahan | G06F 21/566 |
| 2018/0351969 A1 * | 12/2018 | MacLeod | G06F 11/2038 |
| 2019/0042781 A1 * | 2/2019 | Lukacs | G06F 3/0655 |
| 2019/0058718 A1 * | 2/2019 | Pangeni | H04L 63/1466 |
| 2019/0068561 A1 * | 2/2019 | Caragea | H04L 63/06 |
| 2019/0109869 A1 * | 4/2019 | Bailey | H04L 9/14 |
| 2019/0114421 A1 * | 4/2019 | Das | G06F 21/566 |
| 2019/0121571 A1 * | 4/2019 | Wahla | G06F 3/0655 |
| 2019/0121976 A1 * | 4/2019 | Pavlyushchik | G06F 21/561 |
| 2019/0228153 A1 * | 7/2019 | Scaife | G06F 21/565 |

OTHER PUBLICATIONS

Shannon; A Mathematical Theory of Communication; The Bell System Technical Journal; vol. 27; dated Jul./Oct. 1948; 55 total pages.

De Boer, et al.; A Tutorial on the Cross-Entropy Method; Annals of Operations Research; dated 2005; 49 total pages.

A New Christmas Decorated Cerber Ransomware Has Arrived; Business World, Featured, Technology; dated Dec. 19, 2016; 4 total pages.

* cited by examiner

DEVICE-BASED ANTI-MALWARE

BACKGROUND OF THE DISCLOSURE

Field of the Disclosure

This disclosure relates to data storage devices. More particularly, the disclosure relates to systems and methods operable to detect malware in a data storage device.

Description of the Related Art

Ransomware can generally be described as computer malware that installs covertly on a victim's device (e.g., computer, smartphone, wearable device) and that mounts a cryptoviral extortion attack. The cryptoviral extortion attack may be from cryptovirology that holds hostage the victim's data (e.g., user files that contain photos, documents, spreadsheets, etc.), or it may be a cryptovirology leakware attack that threatens to publish the victim's data until a ransom is paid.

Ransomware attacks typically operate under unaware hosts' permissions, and hence data storage devices (e.g., non-volatile memory ("NVM") devices, flash-based storage systems, solid-state drive ("SSD") storage systems, hard disk drive ("HDD") storage systems) are not protected from hosts' writes that encrypt user data after it was read from these devices. Current anti-virus software is generally not effective for ransomware attacks that work via a host with the host permission to write to a data storage device. Accordingly, it is desirable to provide an improved ransomware detector and method of detecting ransomware in a data storage device.

SUMMARY OF THE DISCLOSURE

The disclosure relates to methods and equipment for determining whether a malware attack is suspected. Methods and equipment include a data storage device including a controller; non-volatile memory; a data path between the controller and the non-volatile memory; and an anti-ransomware module configured to monitor the data path. Methods and equipment also include monitoring a data path between a controller and a non-volatile memory on a data storage device; calculating an entropy of a data set to be written to the non-volatile memory; analyzing the calculated entropy; and determining whether a ransomware attack is suspected. Methods and equipment also include monitoring a data path between a controller and a non-volatile memory on a data storage device; identifying activity indicative of ransomware; once activity indicative of ransomware has been identified, calculating an entropy of a data set to be written to the non-volatile memory; analyzing the calculation; and determining whether a ransomware attack is suspected.

In an embodiment, a data storage device includes a controller; non-volatile memory; a data path between the controller and the non-volatile memory; and an anti-ransomware module configured to monitor the data path.

In another embodiment, a method includes monitoring a data path between a controller and a non-volatile memory on a data storage device; calculating an entropy of a data set to be written to the non-volatile memory; analyzing the calculated entropy; and determining whether a malware attack is suspected.

In another embodiment, a method includes monitoring a data path between a controller and a non-volatile memory on a data storage device; identifying activity indicative of ransomware; once activity indicative of ransomware has been identified, calculating an entropy of a data set to be written to the non-volatile memory; analyzing the calculation; and determining whether a ransomware attack is suspected.

In another embodiment, a device includes means for monitoring a data path between a controller and non-volatile memory; means for calculating an entropy of a data set written to the non-volatile memory; means for identifying a suspected ransomware attack based on at least one of: whether the calculated entropy exceeds a threshold value; and whether the calculated entropy exceeds a historic norm.

In another embodiment, a computer program product for determining whether a ransomware attack is suspected, includes a non-transitory, computer-readable storage medium encoded with instructions adapted to be executed by a processor to implement: monitoring activity between a controller and a non-volatile memory; identifying in the activity indications of a ransomware attack; once indications of a ransomware attack have been identified, calculating an entropy of a data set to be written to the non-volatile memory; analyzing the calculated entropy; and determining whether a ransomware attack is suspected to have occurred.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The disclosure relates to methods and equipment for determining whether a malware attack is suspected. Methods and equipment include a data storage device including a controller; non-volatile memory; a data path between the controller and the non-volatile memory; and an anti-ransomware module configured to monitor the data path. Methods and equipment also include monitoring a data path between a controller and a non-volatile memory on a data storage device; calculating an entropy of a data set to be written to the non-volatile memory; analyzing the calculated entropy; and determining whether a ransomware attack is suspected. Methods and equipment also include monitoring a data path between a controller and a non-volatile memory on a data storage device; identifying activity indicative of ransomware; once activity indicative of ransomware has been identified, calculating an entropy of a data set to be written to the non-volatile memory; analyzing the calculation; and determining whether a ransomware attack is suspected.

Malware, short for malicious software, is an umbrella term used to refer to a variety of forms of hostile or intrusive software, including computer viruses, worms, Trojan horses, ransomware, spyware, adware, scareware, and other malicious programs. It can take the form of executable code, scripts, active content, and other software. Ransomware (e.g., Reveton, CryptoLocker, WannaCry, Petya) generally is a type of malicious software from cryptovirology that threatens to publish the victim's data or perpetually block access to it unless a ransom is paid.

Figure 1:
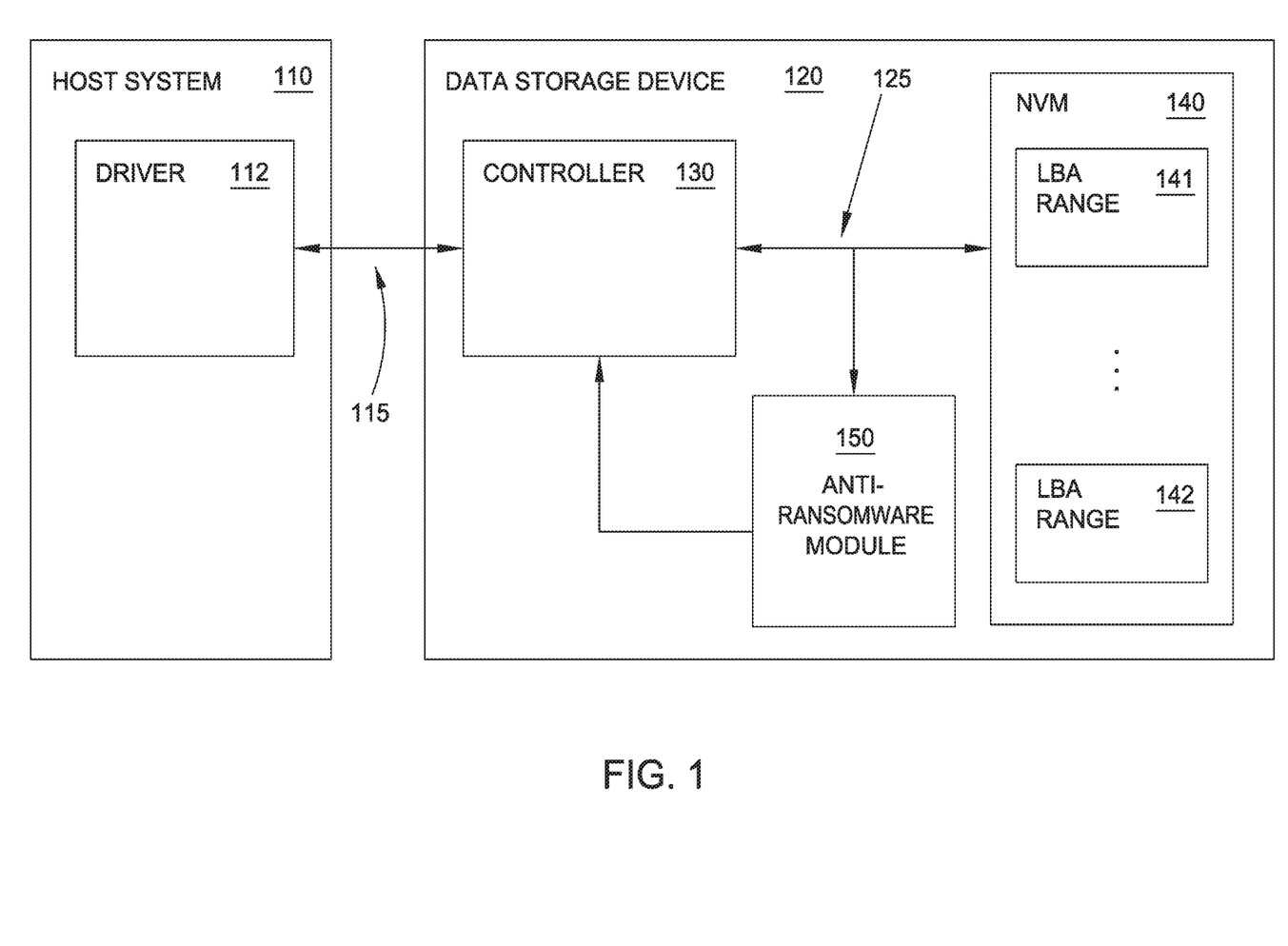
FIG. 1 illustrates a broad overview of a data storage device in accordance with one embodiment disclosed herein.

A broad overview of a data storage device in accordance with one embodiment is shown in FIG. 1. As shown, a data storage device 120 includes non-volatile memory ("NVM") 140, having a plurality of logical block address ("LBA") ranges (e.g., LBA range 141 and LBA range 142). The NVM 140 may include any memory commonly known in the art which provides for durable memory storage, such as non-volatile NAND flash memory. In one embodiment, the NVM 140 is connected to a controller 130 via a data path 125. The data storage device 120 may also include an anti-ransomware module 150, discussed below.

In one embodiment, the NVM 140 receives commands from the controller 130, which in turn receives commands from a host system 110. For example, the host system 110 may be connected to the controller 130 via an interface 115. The interface 115 may be, for example, a high speed serial computer bus. Bus standards for the interface 115 may be PCIe, PCI, PCI-X or AGP bus standards, as non-limiting examples. The host system 110 may include a driver 112 in communication with the controller 130 via the interface 115. In some embodiments, as an example, host system 110 and data storage device 120 may be components on a motherboard. In some embodiments, as another example, host system 110 may be a computing device, and data storage device 120 may be an external, removable storage (such as a USB flash drive). In some embodiments, as yet another example, host system 110 and data storage device 120 may be components of a disk drive system, such as a RAID system. It should be understood that various other arrangements of host systems 110 and data storage devices 120 may be considered.

Figure 2A:
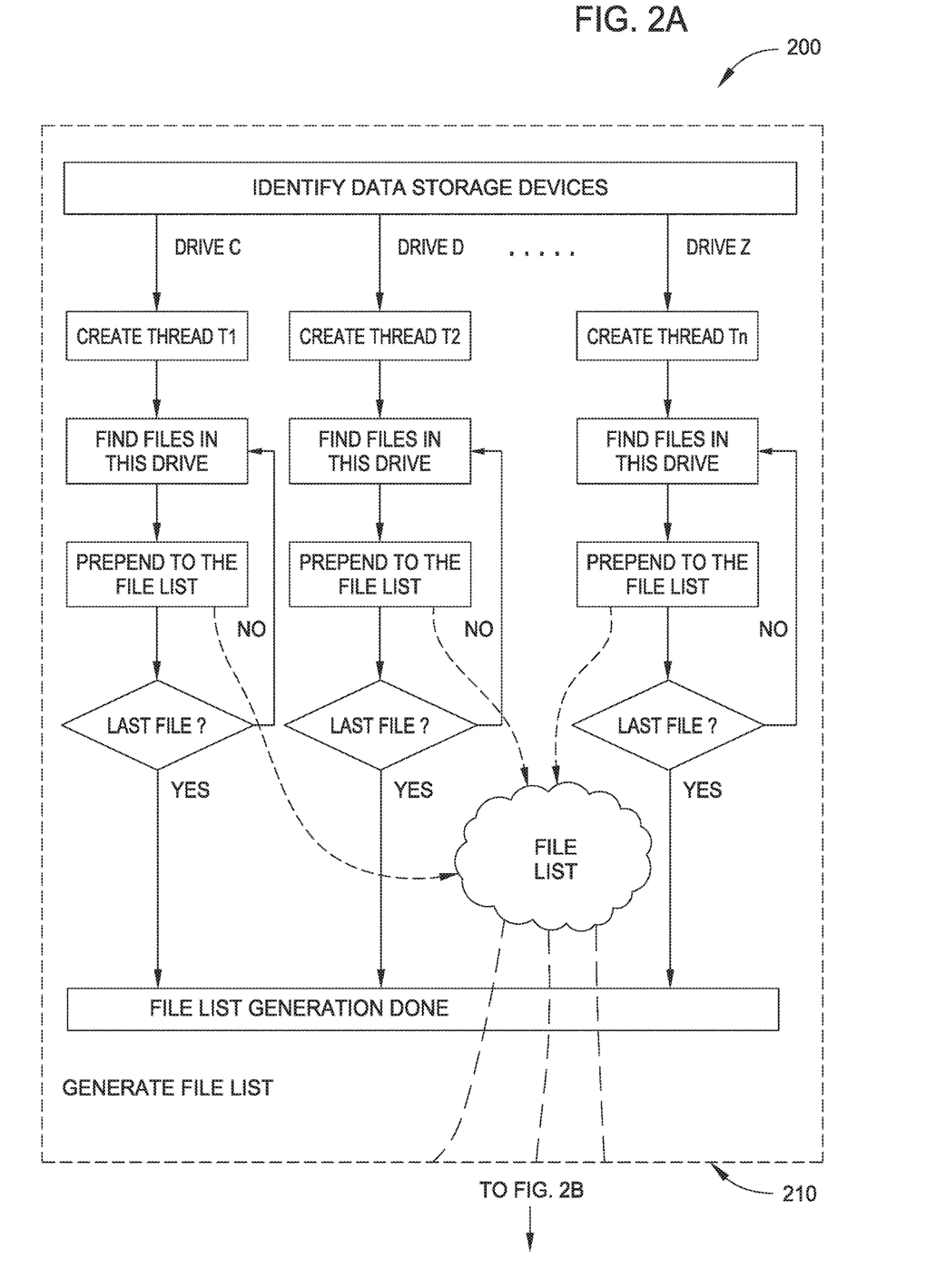
FIGS. 2A and 2B illustrate a typical ransomware process flow.
Figure 2B:
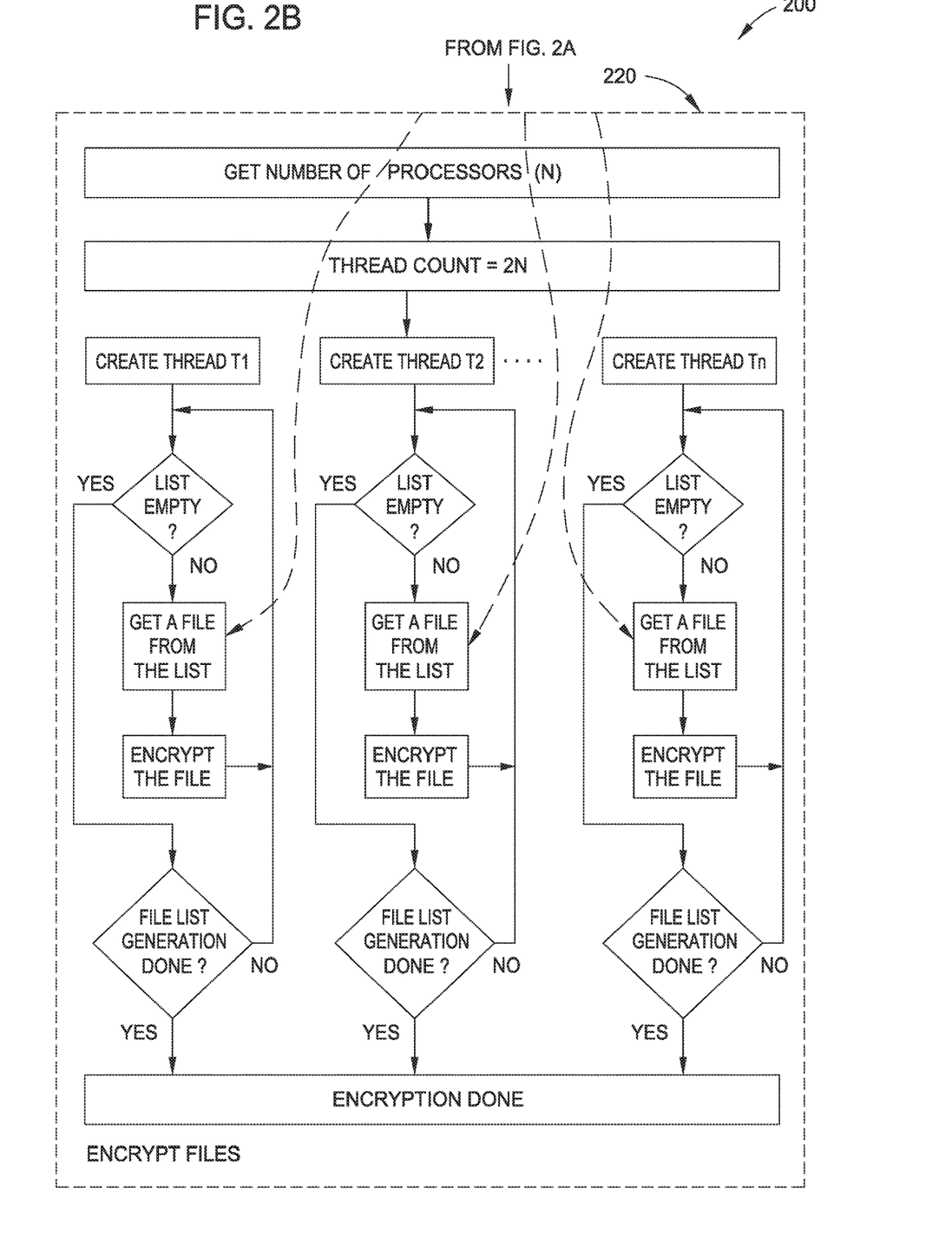

FIGS. 2A and 2B illustrate a typical ransomware process flow 200. As illustrated, the process flow 200 begins at 210, wherein the malware generates a file list. The file list may be generated, for example, by identifying data storage devices (e.g., non-volatile memory ("NVM") devices, flash-based storage systems, solid-state drive ("SSD") storage systems, hard disk drive ("HDD") storage systems) on the victim's device (e.g., computer, smartphone, wearable device) and selecting files with specific extensions on each data storage device. The process flow 200 continues at 220 wherein the malware encrypts the files on the file list. For example, the malware may encrypt the files in series, while using multiple threads. Each of these threads would typically appear to be in a different queue for a NVM data storage device.

Ransomware typically targets user files that contain photos, documents, spreadsheets, etc. These files have known formats and are typically deterministic in terms of content. As such, bit entropy (or simply "entropy") in these files would appear different from an encrypted file. Data storage devices, such as SSDs or HDDs, typically include one or more controllers coupled with one or more NVM arrays. A data storage device may be configured to detect activity indicative of ransomware by providing an anti-ransomware module that may monitor the data path between the controller and the NVM. The anti-ransomware module may calculate the entropy of the data written to the NVM. If the entropy is maximal, or greater than typical or calculated per logical block address ("LBA") range, the anti-ransomware module may identify a suspected ransomware attack (e.g., the user data has been encrypted by a ransomware attack). For example, metric entropy may be used to assess the randomness of a data written to the NVM in a message. Standard values for metric entropy may range from 0 to 1. For example, a threshold value of 0.7 may be set so that a message with a metric entropy greater than 0.7 may cause the anti-ransomware module to identify a suspected ransomware attack.

Furthermore, the anti-ransomware module may be configured to monitor read and/or write accesses to the NVM with the same LBA ranges. The anti-ransomware module may identify historical norms, patterns, and/or anomalies of read and/or write access to the NVM. For example, if a read and later write accesses to the same LBA ranges is detected, this may be activity indicative of ransomware. In some protocols (e.g., F2FS) where user data is not written to the same LBA range, the amount of data that was read and later written, and the difference in entropy thereof, may be used to detect activity indicative of ransomware. In some instances, anomalous timelines of read and/or write access may be activity indicative of ransomware. For example, if a LBA range has been historically accessed once per day or less, frequent accesses over a short time period may be activity indicative of ransomware.

In case the anti-ransomware module detects a suspected ransomware attack, the anti-ransomware module may take remedial action, such as blocking suspicious host writes, informing the host system that a suspected ransomware attack was detected, and/or automatically backing-up LBA ranges that were attacked.

Figure 3:
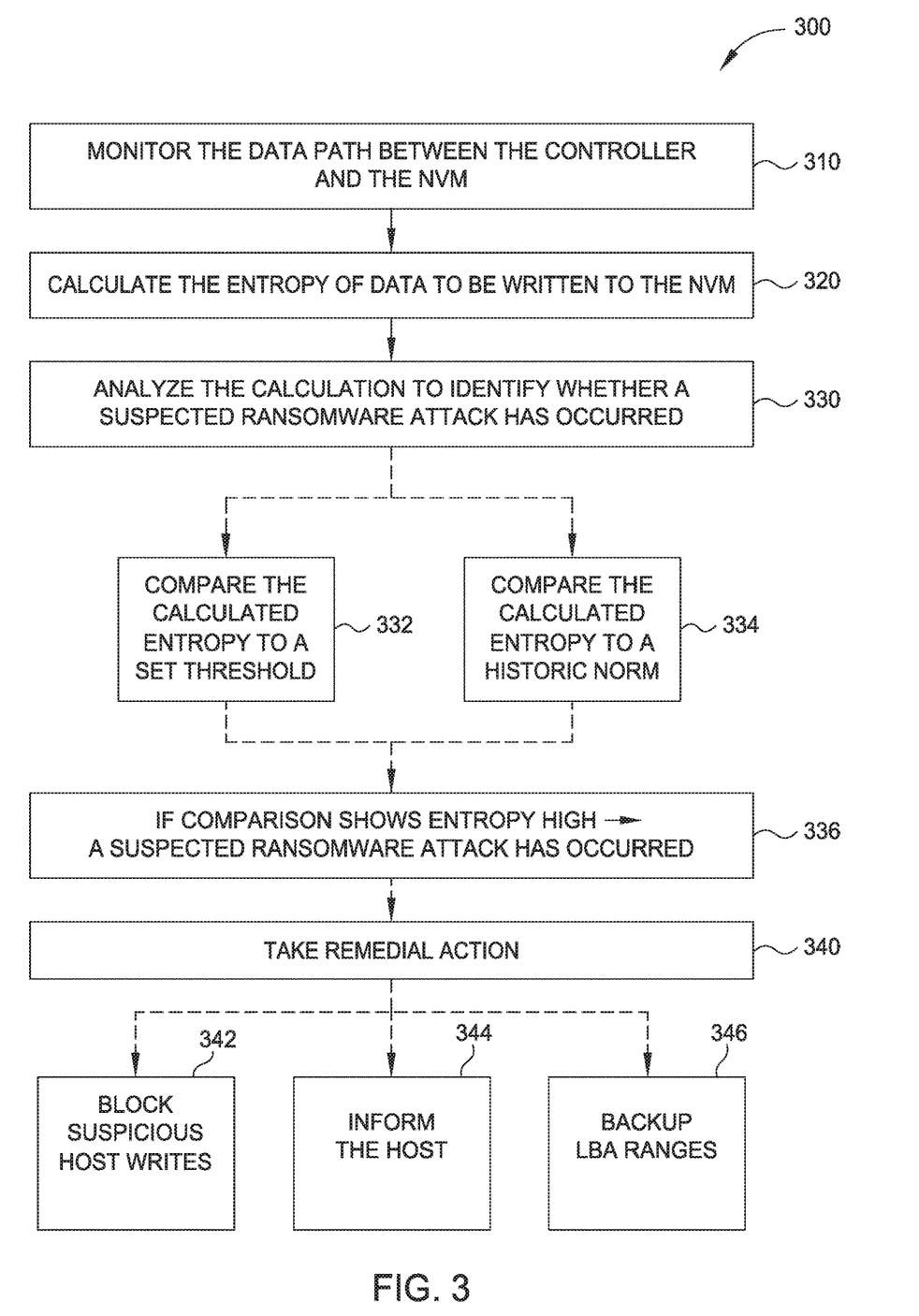
FIG. 3 illustrates a flowchart of a method in accordance with one embodiment disclosed herein.

FIG. 3 is a flowchart illustrating one embodiment of a device-based anti-ransomware method 300. In this example, the data storage device is an SSD data storage device having a controller, NVM, and an anti-ransomware module. The method 300 begins at 310 wherein the data path between the controller and the NVM is monitored. The method 300 continues at 320 wherein the entropy of data written to the NVM is calculated by the anti-ransomware module. In some embodiments, other calculations may be made in addition to, or in lieu of, the entropy of the data written to the NVM. For example, amount of data read and/or written may be calculated. The method 300 continues at 330 wherein the calculation is analyzed to identify whether a suspected ransomware attack has occurred. In some embodiments, the analysis proceeds at 332 wherein the entropy of the data written to the NVM is compared to a threshold value. The analysis 330 proceeds at 336 wherein a calculated entropy higher than the threshold value indicates that a suspected ransomware attack has occurred. In some embodiments, the analysis proceeds at 334 wherein the entropy is compared to historic norms. The analysis 330 proceeds at 336 wherein a calculated entropy higher than the historic norm indicates that a suspected ransomware attack has occurred. In some embodiments, other types of analysis may be done in addition to, or in lieu of, comparison of the entropy of the data written to the NVM. For example, the amount of data read may be compared to the amount of data written. As another example, the entropy of a file that is read may be compared to the entropy of a file that is written. Differences in the amount and/or entropy of written data when compared to read data may be an indication that a suspected ransomware attack has occurred. One example of such a difference may be a read file with a low entropy, such as about 0.30, and a write file with high entropy, such as 0.85. Another example of such a difference may be a read file with an entropy around 0.30 and any write file with an entropy above a threshold value, such as 0.65. In some embodiments, the method 300 continues at 340 wherein the anti-ransomware module takes remedial action to mitigate harm from the suspected ransomware attack. For example, the anti-ransomware module may block suspicious host writes 332, may inform the host system that a suspected ransomware attack has been detected 334, and/or may automatically backup LBA ranges that were deemed to be attacked 336.

Figure 4:
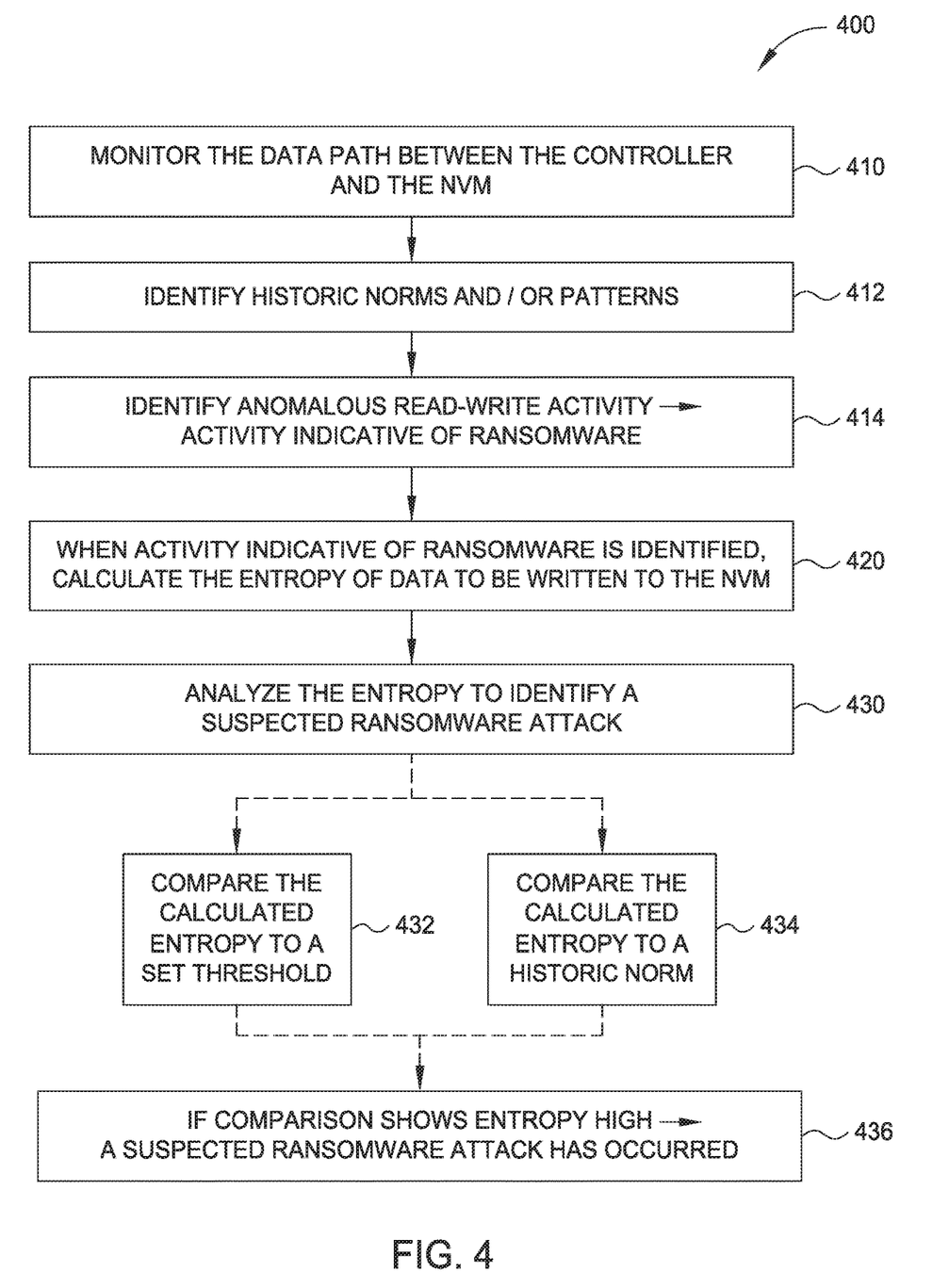
FIG. 4 illustrates a flowchart of another method in accordance with one embodiment disclosed herein.

FIG. 4 is a flowchart illustrating another embodiment of a device-based anti-ransomware method 400. As in the previous example, the data storage device is an SSD data storage device having a controller, NVM, and an anti-ransomware module. The method 400 begins at 410 wherein the data path between the controller and the NVM is monitored. During the monitoring 410, at 412, historic norms and/or patterns of read and/or write activity may be identified. In some embodiments, read-write activity may be logged to provide a standard for identifying anomalous read-write patters. Also as part of monitoring 410, at 414, current read and/or write activity may be compared against the historic norms and/or patterns to identify anomalies. Such anomalies are deemed activity indicative of ransomware. In some embodiments, other activity indicative of ransomware may be identified. For example, such anomalies may include an old file that is changed with a newer file with high entropy, midnight files being replaced with high entropy files, and/or fast read-and-then-write activity with high entropy. The method 400 continues at 420, much the same as in method 300, wherein the entropy of data written to the NVM is calculated by the anti-ransomware module. As in method 300, in some embodiments, other calculations may be made in addition to, or in lieu of, the entropy of the data written to the NVM. For example, amount of data read and/or written may be calculated. The method 400 continues at 430, much the same as in method 300, wherein the calculation is analyzed to identify whether a suspected ransomware attack has occurred. Although not illustrated in FIG. 4, the method 400 may continue with the anti-ransomware module taking remedial action to mitigate harm from the suspected ransomware attack.

To detect activity indicative of ransomware while a write operation is in progress, an anti-ransomware module of a data storage device may monitor write buffer payloads on the data path. For example, the anti-ransomware module may calculate cross-entropy. Since in encrypted data the probability of distribution of numbers of bits will be even, this comparison of cross-entropy may identify an attempt to encrypt plain text, an activity indicative of ransomware. Another example of activity indicative of ransomware includes overwrites of deterministic content by data with high entropy. The anti-ransomware module may inform the host system of such activity indicative of ransomware, signaling that data on that LBA should not be changed.

The anti-ransomware module may prevent encryption of user data by ransomware. For example, the anti-ransomware module on a data storage device may detect changes while receiving a payload. The anti-ransomware module may then write the incoming payload into a new buffer that will be allocated, and notify the host system of the suspected attack. In some embodiments, wherein the host system permits this operation, the new data will replace the old data, but if it is rejected, the old data is retained. In some embodiments, the obsoleted host data may be retained until receiving a secure host indication permitting the old blocks to be retired.

To implement an anti-ransomware module in a data storage device, additional hardware acceleration may be placed inside a security perimeter that monitors the input buffers. The anti-ransomware module may be enabled by activating it from the security perimeter.

As previously discussed, FIG. 1 illustrates is a schematic diagram of one embodiment of a host system 110 and a data storage device 120 with an anti-ransomware module 150 to detect activity indicative of ransomware and/or a suspected ransomware attack. The anti-ransomware module 150 may detect and/or notify the host system 110 of the detected activity indicative of ransomware and/or suspected ransomware attack. The data storage device 120 may be, for example, as a SSD, a HDD, or a hybrid drive. The data storage device 120 includes NVM 140 controlled by a controller 130. Host system 110 communicates with data storage device 120 across interface 115 to provide data storage commands to controller 130. Controller 130 may be configured to receive data storage access commands from host system 110, such as read, write, and erase data commands. Controller 130 may execute the received commands to read, write, and erase data from NVM 140.

The anti-ransomware module 150 may monitor the data path 125 between the controller 130 and the NVM 140. In some embodiments, the anti-ransomware module 150 may monitor the data path 125 by calculating the entropy of data to be written to the NVM. In some embodiments, the anti-ransomware module 150 may monitor the data path 125 by identifying abnormal read-write patterns to the NVM. For example, a fast (e.g., 50% faster than the historic norm) read-write to the same LBA may be deemed abnormal—activity indicative of ransomware. As another example, a read to a first LBA quickly followed (e.g., 50% quicker than the historic norm) by a write to a second LBA, wherein the amount of data in each is comparable, may be deemed abnormal—activity indicative of ransomware. In some embodiments, only when such an abnormal read-write pattern is identified, the anti-ransomware module 150 may calculate the entropy of the data written to the NVM. In some embodiments, the anti-ransomware module 150 may calculate the entropy of the data written to the NVM for all writes to the NVM. The anti-ransomware module 150 may determine whether the calculated entropy is above a predefined threshold value. If so, a suspected ransomware attack deemed to be detected. The anti-ransomware module 150 may respond by taking remedial action, for example:

block suspicious writes to NVM 140, inform the host system 110 that a suspected ransomware attack has been detected, and/or automatically backup LBA ranges of NVM 140 that were deemed to be attacked.

The anti-ransomware module 150 may contain values for the pre-defined threshold value and/or a listing of abnormal read-write patterns. The values and/or listing may be included in firmware and stored on the data storage device 120. The values and/or listing may be updatable. For example, firmware updates for the data storage device 120 may update the pre-defined threshold values and/or listing of abnormal read-write patterns. As another example, the data storage device 120 may log entropy values and/or read-write patterns during periods of normal use. The log may define statistical boundaries for entropy values and/or read-write patterns deemed to be normal. Any read-write pattern outside of the statistical boundaries may be deemed to be abnormal, and thereby included in the listing. As another example, a user of the data storage device 120 may be able to update the pre-defined threshold values and/or listing of abnormal read-write patterns. In some embodiments, security settings may be included on the data storage device restricting the circumstances under which the pre-defined threshold values and/or listing of abnormal read-write patterns may be updated. In some embodiments, the security settings may be updatable. In some embodiments, the anti-ransomware module may include policy settings, for example what action to take in the event of detection of a suspected ransomware attack. In some embodiments, the policy settings may be updatable. In some embodiments, the pre-defined threshold values, listing of abnormal read-write patterns, security settings, and/or policy settings may be updated by a combination of one or more of stored firmware, updatable firmware, logged usage, statistical boundaries, user updates, and security settings restrictions.

In some embodiments, anti-ransomware module 150 may be on a device other than host system 110 or data storage device 120.

In some embodiments, the anti-ransomware module 150 may be implemented at least partially as a hardware solution. For example, hardware implementation of portions of anti-ransomware module 150 may allow for faster, more efficient, and/or more robust monitoring of data path 125, detection of activity indicative of ransomware. In some embodiments, detection of activity indicative of ransomware may be implemented as a hardware solution. In some embodiments, entropy calculation may be implemented as a hardware solution. In some embodiments, identification of a suspected ransomware attack may be implemented as a hardware solution. In some embodiments, notifying the host system may be implemented as a hardware solution.

Embodiments of the present disclosure may be used to advantage in ransomware detection schemes in data storage devices, such as for NAND flash state devices. Embodiments of the present disclosure may provide ransomware detection before encryption occurs, so that remedial action can occur prior to loss.

In an embodiment, a data storage device includes a controller; non-volatile memory; a data path between the controller and the non-volatile memory; and an anti-ransomware module configured to monitor the data path.

In one or more embodiments disclosed herein, the anti-ransomware module is configured to calculate an entropy of data to be written to the non-volatile memory.

In one or more embodiments disclosed herein, the anti-ransomware module is configured to identify a suspected ransomware attack based on the calculated entropy.

In one or more embodiments disclosed herein, the anti-ransomware module is configured to take remedial action once the suspected ransomware attack is identified.

In another embodiment, a method includes monitoring a data path between a controller and a non-volatile memory on a data storage device; calculating an entropy of a data set to be written to the non-volatile memory; analyzing the calculated entropy; and determining whether a malware attack is suspected.

In one or more embodiments disclosed herein, the malware is ransomware.

In one or more embodiments disclosed herein, the analyzing comprises at least one of: comparing the calculated entropy to a threshold value; and comparing the calculated entropy to a historic norm.

In one or more embodiments disclosed herein, the method also includes taking remedial action when the ransomware attack is suspected.

In one or more embodiments disclosed herein, a host system is connected to the controller; the non-volatile memory comprises a plurality of logical block address ranges; and the remedial action comprises at least one of: blocking suspicious host writes to the NVM; informing the host system of the suspected ransomware attack; and backing-up logical block address ranges associated with the suspected ransomware attack.

In one or more embodiments disclosed herein, the data set was to be written to a first logical block address range of the non-volatile memory; the remedial action comprises: allocating a second logical block address range of the non-volatile memory, different from the first logical block address range; writing the data set to the second logical block address range; and retaining the first logical block address range.

In one or more embodiments disclosed herein, the method also includes calculating at least one of an amount of data in the data set read from the non-volatile memory and an amount of data in the data set written to the non-volatile memory.

In one or more embodiments disclosed herein, the method also includes updating the threshold value based on at least one of: a firmware update; a log of read-write activity; and a user input.

In one or more embodiments disclosed herein, the analyzing further comprises at least one of: comparing a first amount of data in the data set that is read from the non-volatile memory with a second amount of data in the data set that is subsequently written to the non-volatile memory; and comparing a first entropy calculation of the data set that is read from the non-volatile memory and a second entropy calculation of the data set that is subsequently written to the non-volatile memory.

In another embodiment, a method includes monitoring a data path between a controller and a non-volatile memory on a data storage device; identifying activity indicative of ransomware; once activity indicative of ransomware has been identified, calculating an entropy of a data set to be written to the non-volatile memory; analyzing the calculation; and determining whether a ransomware attack is suspected.

In one or more embodiments disclosed herein, the analyzing comprises at least one of: comparing the calculated entropy to a threshold value; and comparing the calculated entropy to a historic norm.

In one or more embodiments disclosed herein, monitoring the data path comprises: identifying historic norms or patterns of read-write activity; and identifying anomalous read-write activity relative to the historic norms or patterns.

In one or more embodiments disclosed herein, monitoring the data path further comprises logging historic read-write activity.

In one or more embodiments disclosed herein, activity indicative of ransomware comprises at least one of: a read access of the data set from a first logical block address range and a subsequent write access to the first logical block address range; a difference in a first amount of data in the data set that is read from a second logical block address range and a second amount of data in the data set that is subsequently written to a third logical block address range; and a difference in a first calculation of the entropy of the data set that is read from a fourth logical block address range and a second calculation of the entropy that is subsequently written to a fifth logical block address range.

In one or more embodiments disclosed herein, the method also includes tracking patterns of access of the data set.

In one or more embodiments disclosed herein, activity indicative of ransomware comprises an anomalous frequency of access of the data set in comparison to the tracked patterns of access.

In one or more embodiments disclosed herein, the method also includes taking remedial action comprising at least one of: blocking a write access of the non-volatile memory; informing a host system that a ransomware attack is suspected; and backing-up at least one logical block address range associated with the data set.

In another embodiment, a device includes means for monitoring a data path between a controller and non-volatile memory; means for calculating an entropy of a data set written to the non-volatile memory; means for identifying a suspected ransomware attack based on at least one of: whether the calculated entropy exceeds a threshold value; and whether the calculated entropy exceeds a historic norm.

In one or more embodiments disclosed herein, the means for monitoring the data path between the controller and non-volatile memory determines the historic norm.

In one or more embodiments disclosed herein, the method also includes a means for taking remedial action once the suspected ransomware attack is identified.

In another embodiment, a computer program product for determining whether a ransomware attack is suspected, includes a non-transitory, computer-readable storage medium encoded with instructions adapted to be executed by a processor to implement: monitoring activity between a controller and a non-volatile memory; identifying in the activity indications of a ransomware attack; once indications of a ransomware attack have been identified, calculating an entropy of a data set to be written to the non-volatile memory; analyzing the calculated entropy; and determining whether a ransomware attack is suspected to have occurred.

In one or more embodiments disclosed herein, the analyzing the calculated entropy includes at least one of: determining whether the calculated entropy exceeds a threshold value; and determining whether the calculated entropy exceeds a historic norm.

In one or more embodiments disclosed herein, the method also includes taking remedial action if it is determined that a ransomware attack is suspected to have occurred.

While the foregoing is directed to embodiments of the present disclosure, other and further embodiments of the disclosure may be devised without departing from the basic scope thereof, and the scope thereof is determined by the claims that follow.

What is claimed is:

1. A data storage device comprising:
an interface;
a controller coupled to the interface, the controller being configured to communicate with a host system through the interface and to receive one or more read and write commands from the host system;
non-volatile memory coupled to the controller, the non-volatile memory being configured to communicate with the controller and to receive the one or more read and write commands directly from the controller;
a data path extending directly between the controller and the non-volatile memory, wherein the one or more read and write commands are communicated directly from the controller to the non-volatile memory using the data path; and
an anti-ransomware module configured to monitor the data path by monitoring the one or more read and write commands communicated from the controller to the non-volatile memory, the anti-ransomware module being disposed between the controller and the non-volatile memory and directly coupled to the data path, wherein the one or more read and write commands received by the controller from the host system are unmonitored by the anti-ransomware module.

2. The data storage device of claim 1, wherein the anti-ransomware module is configured to calculate an entropy of data to be written to the non-volatile memory.

3. The data storage device of claim 2, wherein the anti-ransomware module is configured to identify a suspected ransomware attack based on the calculated entropy.

4. The data storage device of claim 3, wherein the anti-ransomware module is configured to take remedial action once the suspected ransomware attack is identified.

5. A method comprising:
receiving one or more read and write commands to a controller of a data storage device from a host system, wherein the controller is coupled to the host system through an interface;
receiving the one or more read and write commands directly from the controller to a non-volatile memory, wherein the one or more read and write commands are communicated directly from the controller to the non-volatile memory using a data path;
monitoring the data path between the controller and the non-volatile memory on the data storage device using an anti-ransomware module disposed between the controller and the non-volatile memory, the anti-ransomware module being directly coupled to the data path, wherein the controller is directly coupled to the non-volatile memory through the data path, and wherein monitoring the data path comprises monitoring the one or more read and write commands communicated from the controller to the non-volatile memory, the one or more read and write commands received by the controller from the host system being unmonitored by the anti-ransomware module;
calculating an entropy of a data set to be written to the non-volatile memory;
analyzing the calculated entropy; and
determining whether a malware attack is suspected.

6. The method of claim 5, wherein the malware is ransomware.

7. The method of claim 5, further comprising calculating at least one of an amount of data in the data set read from the non-volatile memory and an amount of data in the data set written to the non-volatile memory.

8. The method of claim 5, further comprising taking remedial action when the ransomware attack is suspected.

9. The method of claim 8, wherein:
the non-volatile memory comprises a plurality of logical block address ranges; and
the remedial action comprises at least one of:
blocking suspicious host writes to the non-volatile memory;
informing the host system of the suspected ransomware attack; and
backing-up logical block address ranges associated with the suspected ransomware attack.

10. The method of claim 8, wherein:
the data set was to be written to a first logical block address range of the non-volatile memory;
the remedial action comprises:
allocating a second logical block address range of the non-volatile memory, different from the first logical block address range;
writing the data set to the second logical block address range; and
retaining the first logical block address range.

11. The method of claim 5, wherein the analyzing comprises at least one of:
comparing the calculated entropy to a threshold value; and
comparing the calculated entropy to a historic norm.

12. The method of claim 11, further comprising updating the threshold value based on at least one of:
a firmware update;
a log of read-write activity; and
a user input.

13. The method of claim 5, wherein the analyzing further comprises at least one of:
comparing a first amount of data in the data set that is read from the non-volatile memory with a second amount of data in the data set that is subsequently written to the non-volatile memory; and
comparing a first entropy calculation of the data set that is read from the non-volatile memory and a second entropy calculation of the data set that is subsequently written to the non-volatile memory.

14. A method comprising:
receiving one or more read and write commands to a controller of a data storage device from a host system, wherein the controller is coupled to the host system through an interface;
receiving the one or more read and write commands directly from the controller to a non-volatile memory, wherein the one or more read and write commands are communicated directly from the controller to the non-volatile memory using a data path;
monitoring the data path between the controller and the non-volatile memory on the data storage device using an anti-ransomware module disposed between the controller and the non-volatile memory, the anti-ransomware module being directly coupled to the data path, wherein the controller is directly coupled to the non-volatile memory through the data path, and wherein monitoring the data path comprises monitoring the one or more read and write commands communicated from the controller to the non-volatile memory, the one or more read and write commands received by the controller from the host system being unmonitored by the anti-ransomware module;
identifying activity indicative of ransomware;
once activity indicative of ransomware has been identified, calculating an entropy of a data set to be written to the non-volatile memory;
analyzing the calculated entropy; and
determining whether a ransomware attack is suspected.

15. The method of claim 14, wherein the analyzing comprises at least one of:
comparing the calculated entropy to a threshold value; and
comparing the calculated entropy to a historic norm.

16. The method of claim 14, wherein monitoring the data path comprises:
identifying historic norms or patterns of read-write activity; and
identifying anomalous read-write activity relative to the historic norms or patterns.

17. The method of claim 14, wherein monitoring the data path further comprises logging historic read-write activity.

18. The method of claim 14, wherein activity indicative of ransomware comprises at least one of:
a read access of the data set from a first logical block address range and a subsequent write access to the first logical block address range;
a difference in a first amount of data in the data set that is read from a second logical block address range and a second amount of data in the data set that is subsequently written to a third logical block address range; and
a difference in a first calculation of the entropy of the data set that is read from a fourth logical block address range and a second calculation of the entropy that is subsequently written to a fifth logical block address range.

19. The method of claim 14, further comprising tracking patterns of access of the data set.

20. The method of claim 19, wherein activity indicative of ransomware comprises an anomalous frequency of access of the data set in comparison to the tracked patterns of access.

21. The method of claim 14, further comprising taking remedial action comprising at least one of:
blocking a write access of the non-volatile memory;
informing a host system that a ransomware attack is suspected; and
backing-up at least one logical block address range associated with the data set.

22. A device comprising:
means for receiving one or more read and write commands to a controller of a data storage device from a host system, wherein the controller is coupled to the host system through an interface;
means for receiving the one or more read and write commands directly from the controller to a non-volatile memory, wherein the one or more read and write commands are communicated directly from the controller to the non-volatile memory using a data path;
means for monitoring the data path between the controller and the non-volatile memory using an anti-ransomware module disposed between the controller and the non-volatile memory, the anti-ransomware module being directly coupled to the data path, wherein the controller is directly coupled to the non-volatile memory through the data path, and wherein the means for monitoring the data path comprises means for monitoring the one or more read and write commands communicated from the controller to the non-volatile memory, the one or more read and write commands received by the controller from the host system being unmonitored by the anti-ransomware module;

means for calculating an entropy of a data set written to the non-volatile memory;

means for identifying a suspected ransomware attack based on at least one of:

whether the calculated entropy exceeds a threshold value; and whether the calculated entropy exceeds a historic norm.

23. The device of claim 22, wherein the means for monitoring the data path between the controller and the non-volatile memory determines the historic norm.

24. The device of claim 22, further comprising a means for taking remedial action once the suspected ransomware attack is identified.

25. A computer program product for determining whether a ransomware attack is suspected, comprising a non-transitory, computer-readable storage medium encoded with instructions adapted to be executed by a processor to implement:

receiving one or more read and write commands to a controller of a data storage device from a host system, wherein the controller is coupled to the host system through an interface;

receiving the one or more read and write commands directly from the controller to a non-volatile memory, wherein the one or more read and write commands are communicated directly from the controller to the non-volatile memory using a data path;

monitoring activity of the data path between the controller and the non-volatile memory of the storage device using an anti-ransomware module disposed between the controller and the non-volatile memory, the anti-ransomware module being directly coupled to the data path, wherein the controller is directly coupled to the non-volatile memory through the data path, and wherein monitoring the activity of the data path comprises monitoring the one or more read and write commands communicated from the controller to the non-volatile memory, the one or more read and write commands received by the controller from the host system being unmonitored by the anti-ransomware module;

identifying in the activity indications of the ransomware attack;

once indications of the ransomware attack have been identified, calculating an entropy of a data set to be written to the non-volatile memory;

analyzing the calculated entropy; and determining whether the ransomware attack is suspected to have occurred.

26. The computer program product of claim 25, wherein the analyzing the calculated entropy includes at least one of:

determining whether the calculated entropy exceeds a threshold value; and determining whether the calculated entropy exceeds a historic norm.

27. The computer program product of claim 25, wherein the instructions further implement taking remedial action if it is determined that the ransomware attack is suspected to have occurred.

* * * * *